Figure 1:
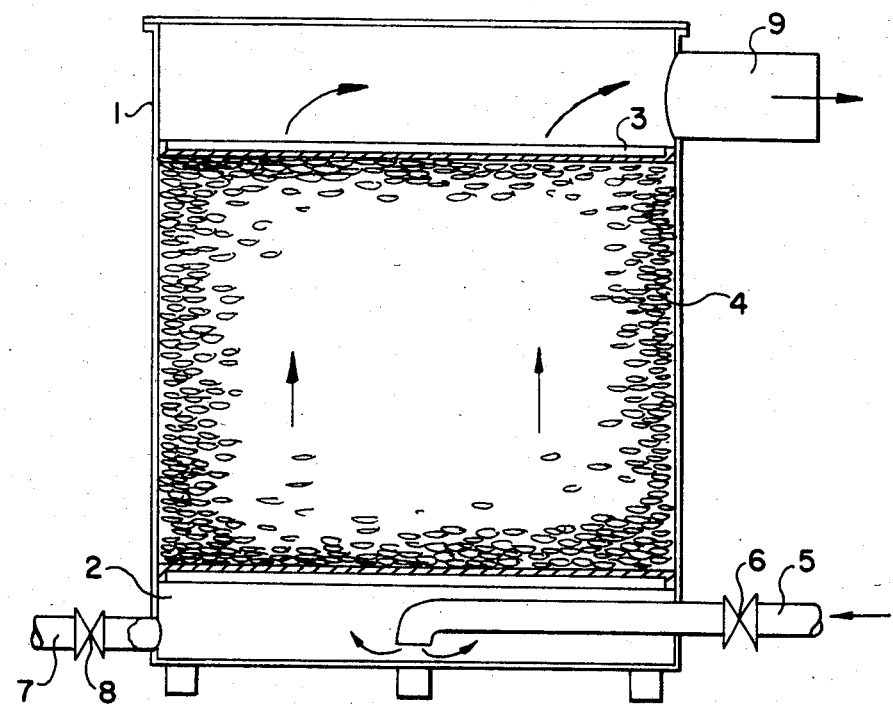

United States Patent [19]

Eriksson

[11] Patent Number: 4,601,825
[45] Date of Patent: Jul. 22, 1986

[54] FILTER FOR SEPARATING OFF LIQUIDS OF HIGH VISCOSITY

[75] Inventor: Hans Eriksson, Kristinehamn, Sweden

[73] Assignee: Swed Sorb Corporation AB, Storfors, Sweden

[21] Appl. No.: 673,746

[22] PCT Filed: Feb. 24, 1984

[86] PCT No.: PCT/SE84/00064
§ 371 Date: Nov. 8, 1984
§ 102(e) Date: Nov. 8, 1984

[87] PCT Pub. No.: WO84/03449
PCT Pub. Date: Sep. 13, 1984

[30] Foreign Application Priority Data

Mar. 8, 1983 [SE] Sweden .................. 8301243

[51] Int. Cl.$^4$ ............................. B01D 29/08
[52] U.S. Cl. .................... 210/287; 210/304; 210/351; 210/502.1; 210/510.1; 210/DIG. 5
[58] Field of Search ............ 210/287, 350, 351, 352, 210/360.1, 502.1, 510.1, DIG. 5, 304

[56] References Cited

U.S. PATENT DOCUMENTS

| | | | |
|---|---|---|---|
| 2,788,128 | 4/1957 | Heine | 210/510.1 |
| 2,877,903 | 3/1959 | Veres | 210/510.1 |
| 3,236,768 | 2/1966 | Litt | 210/360.1 |
| 3,293,174 | 12/1966 | Robjohns | 210/510.1 |
| 3,617,551 | 11/1971 | Johnston | 210/350 |
| 4,183,984 | 1/1980 | Browers et al. | 428/81 |
| 4,274,960 | 6/1981 | Abrahamsson | 210/350 |
| 4,302,337 | 11/1981 | Larson et al. | 210/287 |
| 4,356,090 | 10/1982 | Tran | 210/350 |

Primary Examiner—John Adee
Attorney, Agent, or Firm—Dennison, Meserole, Pollack & Scheiner

[57] ABSTRACT

In order to make better use of tankers transporting oil from the oil-producing countries to oil-consuming countries, attempts have been made at transporting drinking water from the latter countries to the oil-producing. These attempts have been fruitless since it has been impossible to reduce the oil content to an acceptable value. By using a filter consisting of units (4) of foam plastic with perforated closed cells it has been possible to achieve values below that considered acceptable.

13 Claims, 6 Drawing Figures

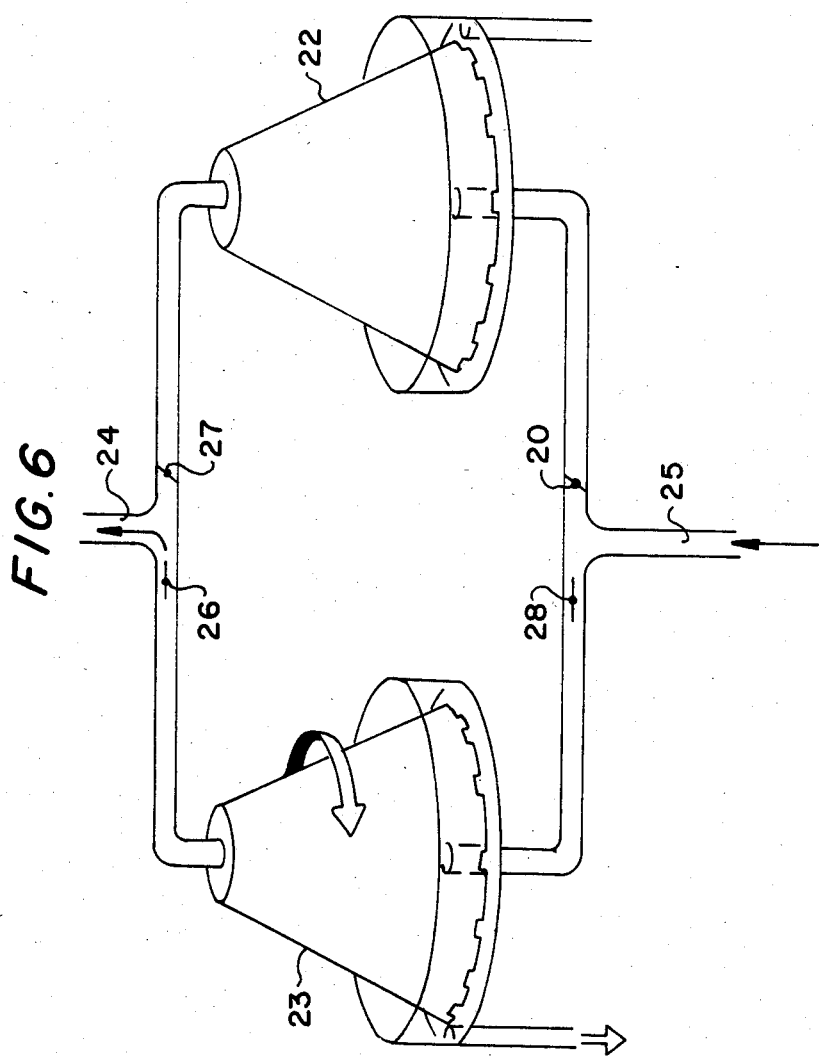

FILTER FOR SEPARATING OFF LIQUIDS OF HIGH VISCOSITY

The present invention relates to a filter for separating off liquids of high viscosity. The liquid primarily under consideration is oil, particularly the oil in normal drinking water which has become an export article. There is a demand for drinking water in the oil-producing countries. For this reason, experiments have been carried out with tankers transporting oil from oil-producing countries to oil-consuming countries. When these ships have delivered their cargo they usually return empty to the oil-producing countries. For economy of transport it would be extremely advantageous if the tankers could carry drinking water on the return journey. This has also been tried. The ship's tanks have been cleaned extremely carefully from oil but in spite of this the oil content in the drinking water has been found to be too high. To be drinkable the oil content in the water should be less than 3 ppm. Hitherto it has proved impossible to get below this limit for the amount of oil which can be tolerated in drinking water.

The present invention has been successful in producing a filter which is able to reduce the oil cotent in drinking water to less than the acceptable value of 3 ppm. According to the invention it is possible to reach an oil content of 2.4 ppm. This reduction of the oil content is achieved by using a filter comprising units made of foam rubber and foam plastic having closed cells which have been perforated.

The units may be enclosed in casings to form cushions. The cushions shall be such that liquid, of both high and low viscosity, can easily pass through. The casings are preferably made of a fabric which is netlike in character.

Said cushions are preferably enclosed in a container through which water containing oil may pass.

According to the invention the flow rate of the liquid through the filter is regulated so that the filter achieves maximum absorption of oil. It has been found that the oil-polluted water should be in contact with the filter for a period not less than 6–8 minutes.

The filter according to the invention may be installed in a tanker and used when drinking water from the ship's tanks is pumped over to reservoirs on land. Drinking water is thus supplied which is acceptable and has an oil content of less than 3 ppm. Another possibility is to arrange the filter on land, in which case the water from the ship's tanks is pumped over into reservoirs and then allowed to pass the filter according to the invention when it is to be supplied to a consumer.

The units of foam plastic are generally made of polyethylene, polypropylene or a copolymer of polyethylene and metacrylic acid.

The units are preferably packed in cushions having outer dimensions 3×4 cm and a maximum height of 1.5 cm. Such a cushion can absorb approximately 6 times its own weight in oil.

If the cushions are placed in a container they themselves take up only 20% of the volume of the container. Polluted water can therefore easily flow through the container.

Although the invention is a solution to the problem of transporting drinking water in oil tankers, it is evident that a filter according to the present invention can also be used for other low-viscosity liquids containing high-viscosity liquids, when the high-viscosity liquid is to be separated out from the low-viscosity liquid.

Another field of application is the separation of creosote oil from water. A residual product consisting of water and creosote oil is obtained when impregnating timber with creosote oil.

Further characteristics of the present invention are revealed in the following claims.

Figure 2:
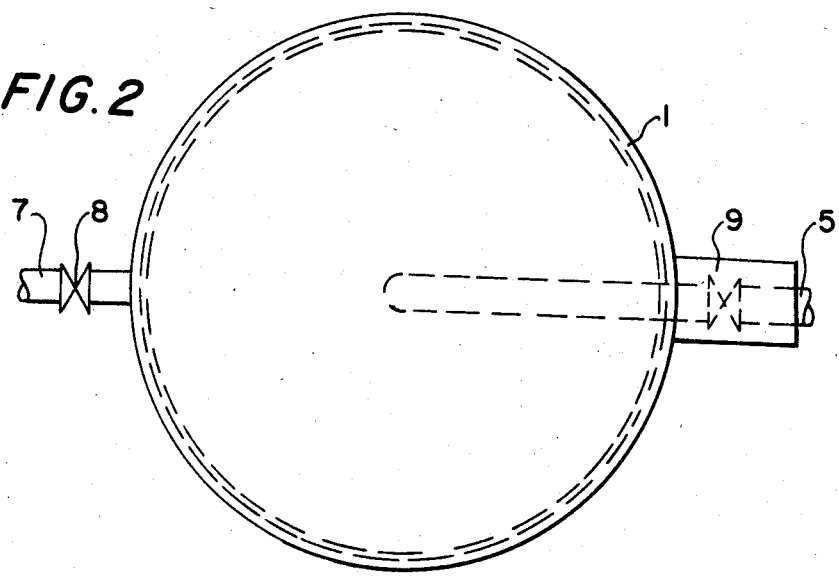
Figure 3:
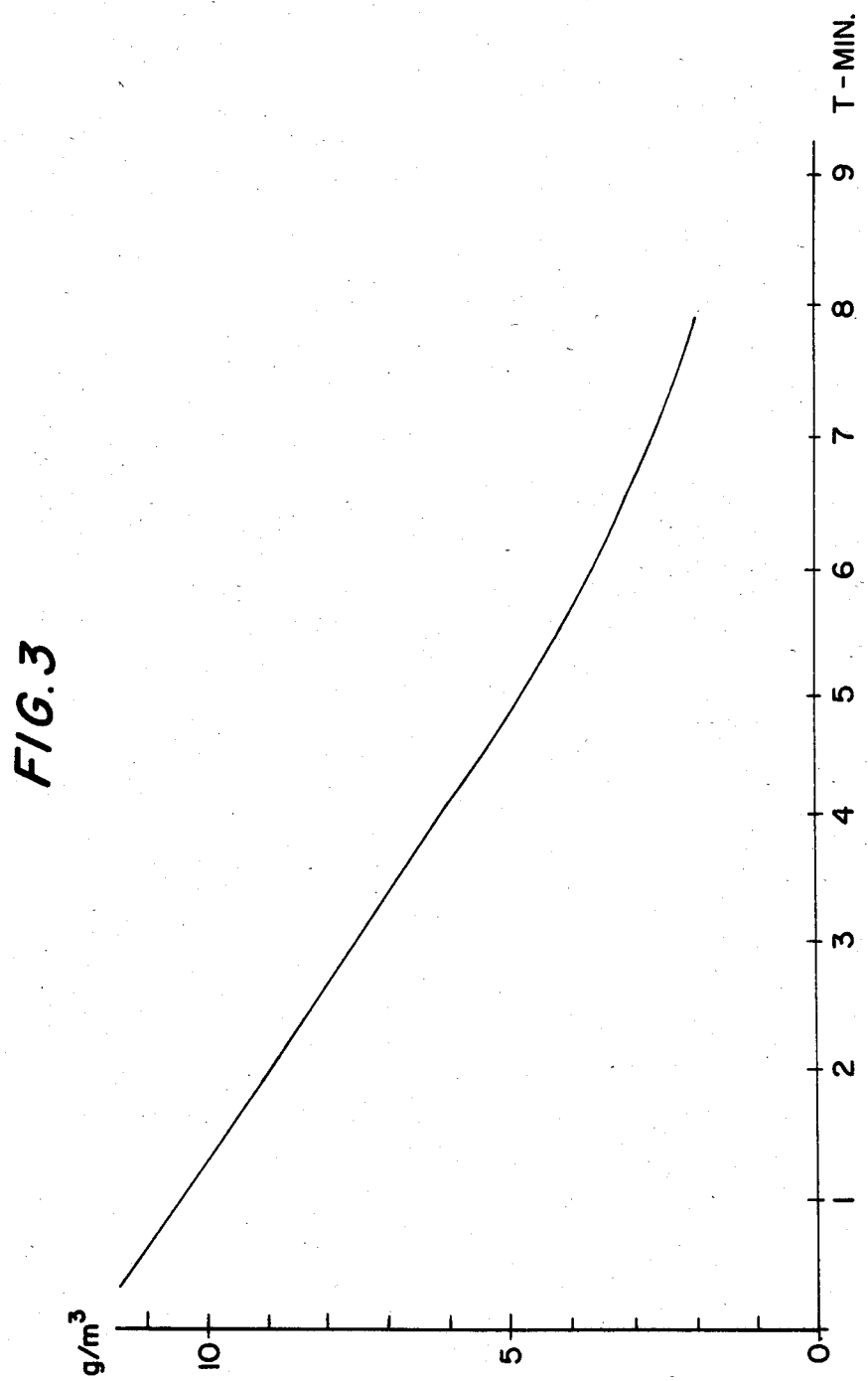
Figure 4:
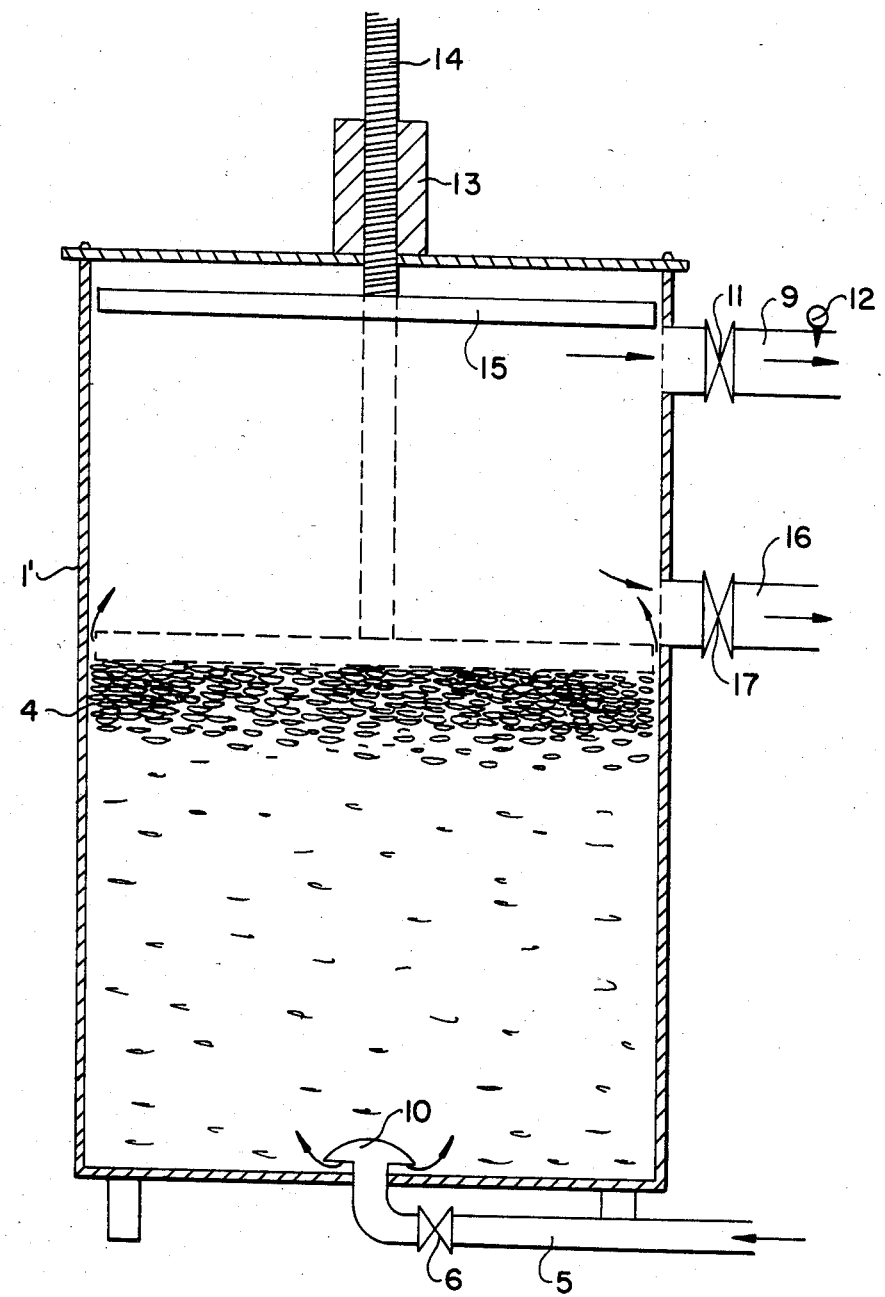
Figure 5:
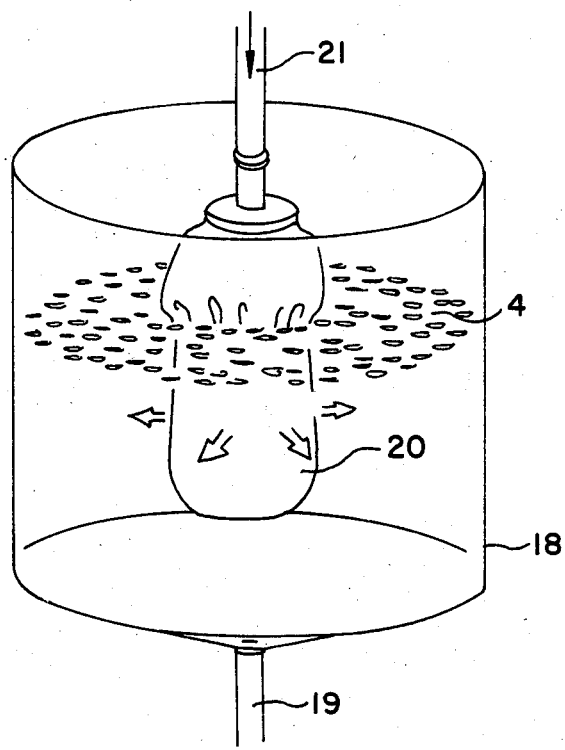

The present invention will be described more fully with reference to the accompanying five drawings, in which FIG. 1 shows a vertical section through a container containing the filter according to the present invention, FIG. 2 shows the container seen from above, FIG. 3 shows the oil content in water which has passed through the oil filter according to the present invention in relation to the contact time, FIG. 4 shows a container with a compression means, FIG. 5 shows a container with a first embodiment of the compression means, and FIG. 6 shows a container with a second embodiment of the compression means.

The invention requires units of foam plastic or foam rubber with closed cells which have been perforated. These units are preferably made of granulated polyethylene mixed with small quantities of powder additives to initiate the formation of blisters, i.e. to form closed cells. The mixture is fed into the first stage of a two-stage extruder of screw type and the mixture is heated to ca. 200° C. The melt obtained is fed into a second extruder stage in which the temperature is lowered to 100°–150° C. The melt is then forced out through an annular nozzle. A porous hose is obtained which is cooled internally and externally with air, and cut up in the longitudinal direction, producing a strip of foam plastic. The strip is passed through a machine where the closed cells are perforated. The strip with perforated cells is reduced to small units each having a volume of ca. 1 cm$^3$. These units are inserted into a cushion-cover with dimensions 3×4 cm and a maximum height of 1.5 cm. Such a cushion will have a volume of ca. 7 cm$^3$. The cushion-cover is suitably made of a fabric allowing through oil-polluted water. It is preferably made of a net-like fabric, preferably a wide-meshed net. The fabric is suitably made from threads of plastic. A filled, unused cushion weighs ca. 2 gram. A maximally used cushion, i.e. a cushion in which the maximum absorption capacity has been utilized, weighs 13 gram.

Cushions of the type described above are placed in a container 1 having a lower inflow wall 2 and an upper outflow wall 3. These two walls may be of wire netting or perforated sheet metal. The cushions are arranged between the two walls. When the space between the two walls is filled with cushions, the cushions will take up 20% of the total volume. Below the inflow wall 2 is an inlet pipe 5 for oil-polluted water. The inlet pipe is provided with a member 6 to regulate the through-flow rate and quantity of oil-polluted water. The member may consist of a valve. The inlet pipe opens into a space below the inflow wall 2. An outlet pipe 7 with valve 8 is also connected to this space. The container is provided at the top with a pipe 9 for supplying purified drinking water.

The container 1 described above is suitably located on an oil-tanker. When water is to be emptied from the ship's tanks it is allowed to pass through the filter in the container 1. The water is supplied to the inlet pipe 5, flows up through the space in which the cushions 4 are arranged, and then out through the pipe 9 to the consumer. The through-flow rate of the drinking water should peferably not be less than 6-8 minutes.

Alternatively the container 1 with cushions 4 may be placed on land. It is then connected between a reservoir and the consumer. In this case, the drinking water is pumped directly from the ship to the reservoir.

Practical experiments have been performed using a filter according to the present invention in which the space for the cushions 4 had an area of 0.5 dm$^2$ and a height of 6 dm. A dosing pump with variable capacity from 0 to 5.41 was used. The quantity of oil remaining in the filter after passed of oil-polluted drinking water was determined. The values obtained have been compiled together with other conditions in the following table and in the graph shown in FIG. 3 where the y-axis indicates the quantity of oil in gram/m$^3$ and the x-axis indicates the contact time with the filter units in minutes.

TABLE

| Experiment No. | Flow l/min | Filter rate m/h | Contact time min | Oil content, g/m$^3$ |
| --- | --- | --- | --- | --- |
| 1a | 5.4 | 65 | 0.17 | |
| 1b | 5.4 | 65 | 0.27 | |
| 2a | 1.45 | 17 | 0.62 | 11.5 |
| 2b | 1.45 | 17 | 1.0 | |
| 3a | 0.50 | 6.0 | 1.8 | 10.4 |
| 3b | 0.50 | 6.0 | 2.9 | 7.6 |
| 4 | 0.195 | 2.3 | 12.0 | 2.4 |

From the table and graph, therefore, it can be seen with the help of a filter according to the present invention, a drinking water can be obtained which is only polluted by 2.4 ppm oil, which is below the maximally permitted oil content of 3 ppm.

FIG. 4 shows a container 1' which is filled to a certain level with cushions 4. A pipe 5 is connected to the bottom of the container via a valve 6. A cap is placed over the inlet end to prevent it being blocked by cushions lying over it. The pipe 5 is for the supply of water containing oil particles which is to be purified. At the upper end of the container is an outlet pipe 9 with valve 11, for the supply of purified water. The pipe 9 also contains an oil gauge or indicator 12, this member indicating the quantity of oil pollution in water leaving the container 1'. The oil gauge can be set so that at a certain degree of pollution in the water leaving the container 1', an indication is given which can be utilized to control various members. A pressure plate 15 is arranged in the container 1', said plate being provided centrally with a screw-threaded rod 14 cooperating with an equivalently threaded sleeve 13. The rod can be screwed up and down, either manually or by a motor. The rod should be long enough to allow the plate 15 to be screwed down and screwing continued to compress the cushions 4 so that oil collected in the cushions is pressed out and leaves the cushions via the periphery of the pressure plate 15. Oil pressed out is caused to leave the container 1' through an outlet pipe 16 provided with a valve 17.

The means according to FIG. 4 functions as follows: Normally the pressure plate 15 is in its upper position, the valves 6 and 11 are open and the valve 17 is closed. The water will now pass through the filter emitting oil to it, after which purified water passes valve 11 and through pipe 9 for consumption. Water flowing through the pipe 9 is monitored by the oil gauge 12 to ensure that the quantity of oil does not exceed a permitted value. Should the quantity exceed the permitted value because the cushion cells are unable to absorb the desired quantity of oil, the indication from the oil gauge is utilized to close valves 6 and 11, open valve 17 and cause the pressure plate to move down and compress the cushions so that oil collected therein will leave the container via pipe 16. When the oil has been pressed out, the automatic system initiated by the oil gauge will return the pressure plate to its original position, close valve 17 and open valves 6 and 11. The procedure described is repeated when the oil gauge indicates that the quantity of oil in the water flowing out of the container exceeds the permitted value.

It is no doubt obvious that a pressure medium can be used instead of the pressure plate to compress the cushions 4. This pressure medium is most suitably a gas, but obviously other phases of a pressure medium are feasible since the pressure medium used can be removed from the contain 1' through the pipe 16. If a pressure medium is used, the valve 17 must be closed during certain periods of the compression.

It should also be clear that it is advisable to provide the inlet openings to pipes 9 and 16 with grids to prevent the cushions 4 from leaving the container.

FIG. 5 shows a container 18 holding the filter-cushions 4 described above. An inlet pipe 19 supplies the liquid to be filtered. A sack-like unit 20 consisting of rubber or some other elastomeric material is arranged inside the container. The unit has a connection 21 for the supply of pressure medium which may be liquid, air or some other medium. If pressure medium is supplied to the unit 20 it will expand and, due to its expansion, will press out the oil collected in the cushions 4.

In FIG. 6 the former container 1 has been replaced by two containers 22 and 23, designed to be used together with valves 26,27,28 and 29. Liquid to be filtered is supplied through supply pipe 25 to either one of the containers 22 and 23, and filtered liquid leaves the relevant container 22 or 23 through outlet pipe 24. The two containers 22 and 23 can be caused to rotate and oil absorbed by the cushions in the containers 22 and 23 will be removed therefrom by means of centrifugal force. The whole arrangement functions in such a way that while one of the containers is being used for filtering, the other container is subjected to centrifuging so that it is ready to perform its function as filter when the filtering capacity in the first container is lost.

Creosote oil is used to impregnate timber and when impregnation is complete, water containing a certain amount of creosote oil remains. The water containing creosote oil can be entirely or partially freed from the oil by means of a filter according to the present invention and the oil can then be used again for impregnation. This gives a better degree of utilization of creosote oil for impregnation.

What is claimed is:

1. A filter means for separating, by absorption, a high viscosity liquid from a low viscosity liquid, comprising:
   a container having liquid in-flow and liquid out-flow means, and having therein a multiplicity of filter cushions, each said cushion comprising a cover of a mesh material having therein at least one filter unit of closed cell foam polymer material in which said closed cells ae perforated, said filter cushions each being capable of absorbing about six times its weight of high viscosity liquid, and the total volume of said cushions being no more than about 20% of the volume of said container.

2. Filter according to claim 1, characterised in that each unit (4) consists of foam plastic or foam rubber.

3. Filter according to claim 2, characterised in that each foam plastic unit (4) consists of polyethylene, polypropylene or a copolymer of polyethylene and metacrylic acid.

4. Filter according to claim 1, characterised in that the volume of each cushion is in the order of 7 cm$^3$.

5. Filter according to claim 1, characterised in that the container (1') contains means (13–15) for compressing the units (4) to remove liquid of high viscosity collected there and is provided with an outlet (16) for the high viscosity liquid pressed out.

6. Filter according to claim 5, characterised in that said means (13–15) comprise a pressure medium such as air.

7. Filter according to claim 5, characterised in that said means (13–15) comprise a pressure plate mechanically movable to and from the units (4).

8. Filter according to claim 1, wherein said container comprises a member provided to regulate the flow rate of liquid therethrough, and thereby the contact time between the liquid and said at least one filter unit.

9. Filter according to claim 8, wherein said member is adjusted so that liquid passing through said out-flow means contains less than 3 ppm of the high viscosity liquid.

10. Filter according to claim 8, wherein said filter means is provided in conjunction with an oil tanker vessel such that fresh water passes into said tanker when empty and may be removed therefrom through said filter means.

11. Filter according to claim 5, wherein said outlet means includes a valve and a means for determining the content of high viscosity liquid in the liquid passing through said valve, and further includes means for activating said means for compressing at a predetermined content of high viscosity liquid passing through said valve, said means for activating including means for closing said inlet means and said outlet means, and means for opening of said outlet for the high viscosity liquid, at the beginning of said compression, and means for opening said inlet means and said outlet means and closing said outlet for the high viscosity liquid at the completion of said compression.

12. Filter according to claim 5, wherein said means for compressing comprises an expandable, sack-like unit.

13. Filter according to claim 5, wherein said means for compressing comprises means for subjecting said at least one filter unit to centrifugal force.

* * * * *